United States Patent [19]

Byrnes

[11] 3,874,853

[45] Apr. 1, 1975

[54] PROCESS FOR DETERMINING THE CONCENTRATION OF INORGANIC PHOSPHATES IN HUMAN FLUIDS

[75] Inventor: Ronald K. Byrnes, Brockton, Mass.

[73] Assignee: Damon Corporation, Needham, Mass.

[22] Filed: Nov. 16, 1972

[21] Appl. No.: 307,059

[52] U.S. Cl............................. 23/230 B, 23/230 R
[51] Int. Cl............................................ G01n 33/16
[58] Field of Search ...................... 23/230 B, 230 R

[56] References Cited
UNITED STATES PATENTS

| | | | |
|---|---|---|---|
| 3,547,586 | 12/1970 | Denny.............................. | 23/230 B |
| 3,771,961 | 11/1973 | Denney............................. | 23/230 B |
| 3,795,484 | 3/1974 | Daly et al.......................... | 23/230 B |
| 3,795,484 | 3/1974 | Daly................................. | 23/230 B |
| 3,801,466 | 4/1974 | Denney............................. | 23/230 B |

*Primary Examiner*—Barry S. Richman
*Assistant Examiner*—Dale Lovercheck
*Attorney, Agent, or Firm*—Kenway & Jenney

[57] ABSTRACT

In a testing procedure for determining the concentration of a organic phosphate in human fluids by determining the amount of light absorbance of a chromogen in a test sample formed by reacting the constituent with at least two reagents in two separate steps, a true blank is prepared having a light absorbance representative of all the constituents in the sample other than the chromogen. The true blank is prepared by adding the same reagents to a blank sample in a sequence different from that used for the test sample so that the conditions under which the chromogen is formed are avoided in the blank sample.

4 Claims, No Drawings

3,874,853

PROCESS FOR DETERMINING THE CONCENTRATION OF INORGANIC PHOSPHATES IN HUMAN FLUIDS

BACKGROUND OF THE INVENTION

This invention relates to a method for determining the concentration of chemical constituents in human fluids.

Presently, constituents in samples of blood and urine are determined by reacting the sample with a reagent or reagents that form a chromogen with the constituent being tested and thereafter measuring the absorbance of electromagnetic radiation at a given wavelength by the reacted sample. The concentration of the ingredient being tested is determined in accordance with Beer's Law.

In one type of reaction system, the constituent being tested is reacted with a reagent either in an acidic or basic medium to convert the constituent to a compound which then can be reacted with a second reagent at a different pH than the first reagent to form a chromogen with the previously obtained compound. For example when determining inorganic phosphate concentration in a human fluid, a sample of the fluid first is reacted with an acidic solution of ammonium molybdate to form a phosphomolybdate complex which is formed only in an acidic medium. Thereafter, a basic solution of a reducing agent such as ferrous sulfate or dipyrone is added to the sample to form a blue or bluish-green chromogen by reduction of the phosphomolybdate complex. The sample then is exposed to electromagnetic radiation at a particular wavelength and the absorbance thereof is measured. The concentration of the phosphate in the sample can be determined from a standard curve relating concentration as a function of electromagnetic radiation absorbance.

Since unreacted reagents and other ingredients of the sample may themselves absorb the electromagnetic radiation to which the sample is exposed, it is preferred to conduct the same testing procedure with a blank sample to which is added, in the same amount as the test sample, the same reagents with the exception of at least one reagent so that the chromogen is not formed. The electromagnetic radiation absorbance of the blank is measured and this absorbance is subtracted from the absorbance observed for the test sample thereby "screening out" the absorbancy of materials other than the chromogen and improving the accuracy of the test.

Unfortunately, even with the use of a blank in the manner described above, inaccuracies in the test procedures occur since one or more of the reagents are not included in the blank, the light absorbance of the excluded reagent or of any extraneous absorbing compounds formed by reaction of this reagent with constituents of the fluid sample other than that being measured is not taken into account in subtracting the value determined for the blank from the value determined for the test sample. Therefore, it would be highly desirable to provide a blanking technique which would account for the electromagnetic radiation absorbance of all the ingredients in the test sample and all products of side reactions other than the chromogen so that the light absorbance of the chromogen can be determined. Only in this manner can an accurate determination be obtained for the actual concentration of the constituent being tested.

SUMMARY OF THE INVENTION

The present invention provides a testing procedure for determining the concentration of a constituent in a human fluid such as blood or urine whereby the light absorbance of a chromogen formed from the constituent in a test sample and the light absorbance of a blank sample are determined and wherein the light absorbance value for the blank sample comprises the light absorbance of all the ingredient in the test sample and all products of side reaction other than the chromogen.

In accordance with this invention a test sample of a human fluid is reacted with at least two reagents in at least two steps to form a reaction product which absorbs electromagnetic radiation in accordance with Beer's law and a blank sample of the same human fluid is admixed with all of the same reagents in a different sequence than that used for the test sample such that reaction conditions at which the chromogen is formed do not occur in the blank sample. The electromagnetic radiation absorbance for both the test and blank samples then are determined and the absorbance for the reaction product is obtained by subtracting the blank sample absorbance from the test sample absorbance.

DESCRIPTION OF SPECIFIC EMBODIMENTS

The present invention will be described specifically hereinafter with reference to a direct micro method for determining the phosphate concentration in a human fluid such as urine or blood which employs at least two reagents which are added sequentially to a test sample and wherein a compound of the constituent being tested for is formed under one set of conditions and subsequently a second reagent is added to the compound to form a chromogen only under a second set of reaction conditions. For example, in many test procedures, a compound of the constituent being tested for is formed either under acidic or basic conditions and thereafter, a chromogen-forming reagent is added to the sample under pH conditions different from the conditions under which the first reagent was added. Alternatively, a compound of the constituent being tested is formed under specific catalytic conditions and the chromogen is formed from this compound in a separate step under different catalytic conditions. It is to be understood that this invention can be used in any test procedure where chemical reagents are added to a sample sequentially in a specific sequence to form a compound capable of absorbing electromagnetic radiation but when the reagents are added to the sample in a different sequence the compound is not formed.

In accordance with this invention when testing for inorganic phosphorus in serum or urine, a test procedure is employed based on the fact that inorganic phosphorus forms a phosphomolybdate complex under acidic conditions and the complex is reduced to form a chromogen when reacted with dipyrone under basic conditions. Two diluted samples are added to separate containers, one comprising the test sample and the other the blank sample. A basic dipyrone reagent is added to the blank sample and mixed therewith and ammonium molybdate is added to the test sample under acidic conditions. The ammonium molybdate reacts with the inorganic phosphorus to form the phosphomolybdate complex. On the other hand, no reaction occurs in the blank sample. Thereafter, the acidic ammonium molybdate reagent is added to the blank sample in the same amounts as previously added to the test sample. However, no reaction occurs in the blank sample since the conditions therein are not sufficiently acidic to form the phosphomolybdate complex and therefore no reduction occurs and no chromogen is formed even though the dipyrone is present. The basic dipyrone reagent is added to the test sample in the same amount as previously added to the blank sample. In the test sample, reaction to form a bluish chromogen occurs since the phosphomolybdate complex has been previously formed therein. Each of the sample then is subjected to light of a frequency of 340 nm and the absorbance measured with a spectrophotometer. The light absorbance value of the blank then is subtracted from the light absorbance value of the test to obtain the light absorbance value for the chromogen. The concentration of inorganic phosphate then is obtained from a standard curve relating concentration of the inorganic phosphate as a function of light absorbance of the chromogen in accordance with Beer's law. The standard curve is contructed from inorganic phosphorus standards made up in 4% albumin. In this manner, an accurate value of the concentration of inorganic phosphate is determined since any light absorbance caused by an excess of reagents not reacted with inorganic phosphate in the sample has been subtracted from the value obtained for the test sample.

The process of this invention provides substantial advantages over those of the prior art since the prior art has relied upon procedures wherein at least one reagent is eliminated from the blank sample in order to prevent formation of the chromogen. In contrast, this invention permits the addition of all the reagents used in the test sample to be added to the blank sample so that an accurate value can be obtained the light absorbance of material in the test sample other than the chromogen.

The following examples illustrate the present invention and are not intended to limit the same.

Example I

An acidic ammonium molybdate solution was prepared as follows:

An ammonium molybdate solution was prepared by dissolving 61.79 grams ammonium molybdate in deionized water and diluting it to one liter. A sulfuric acid solution was prepared by mixing 277.5 ml. concentrated sulfuric acid, specific gravity 1.84, and 300 ml deionized water which then was diluted to one liter. The acidic ammonium molybdate solution was prepared by mixing 30 parts of the sulfuric acid solution with 30 parts of the ammonium molybdate solution and 40 parts of deionized water. The final solution comprised 1.5M sulfuric acid and 0.015 M ammonium molybdate.

An alkaline dipyrone reagent having the formulation described below was prepared as follows:

| | |
|---|---|
| Polyvinylpyrrolidone (M.W. 10,000) | 0.01% |
| Ethanol (95%) | 7.5% |
| Dipyrone (430mg/l) | 0.00012M |
| NaOH | 0.5M |
| $Na_2CO_3$ | 0.5M |

The polyvinylpyrrolidone-ethanol improves the sensitivity, stability and recovery of the chromogen. The NaOH—$Na_2CO_3$ buffers the reaction medium and resolubilizes any protein precipitate or suspension which may form.

A blank sample and a test sample are prepared by diluting one part plasma or serum in 19 parts of deionized water. To 0.1 ml of the blank sample was added 1.0ml of the alkaline dipyrone reagent and mixed therewith. To 0.1 ml of the test sample was added 0.2ml of the acid molybdate reagent and mixed therewith to form the phosphomolybdate complex. A second addition to each sample was effected by adding 0.2 ml of the acid molybdate solution to the blank sample and 1.0 ml of the alkaline dipyrone solution to the test sample and mixing after each addition. In the test sample, the reduction of the phosphomolybdate to the blue chromogen molybdenum blue was immediate while no reaction occurred in the blank sample.

Each sample was subjected to light at 340 nm and the light absorbance of each was measured with a spectrophotometer. By subtracting the light absorbance for the blank from the light absorbance for the test, recoveries for the inorganic phosphate from 9 runs was 99.1±5.7%.

In the procedure of this example, it has been found that the polyvinylpyrrolidone should have a molecular weight less than 40,000 in order to obtain the desired improved sensitivity, stability and recovery of the end product. Other water soluble polymers such as acacia also can be employed. Suitable solvents other than ethanol that can be employed are methanol, methyl cellusolves, dimethylformamide, and dimethylsulfoxide. The procedure described in this example followed Beer's law up to a concentration of 14 mg/dl of phosphorus.

I claim:

1. In a process for determining the concentration of inorganic phosphate in human fluids wherein a test sample of a human fluid is treated with an acidic aqueous solution of ammonium molybdate to form a reducable phosphomolybdate complex in a first step and reacting said complex with a basic aqueous solution of a reducing agent to form a reaction product capable of absorbing electromagnetic radiation in accordance with Beer's law and wherein the electromagnetic radiation absorbance of said reaction product is measured, the improvement which comprises forming a blank sample of said human fluid by admixing said human fluid in a container separate from said test sample first with the basic aqueous solution and thereafter with all the other reagents added to the test sample under conditions such that the final blank sample has a pH higher than that at which the phosphomolybdate is formed while retaining all reagents in solution and comparing the electromagnetic radiation absorbance of the blank sample with the electromagnetic radiation absorbance of said reaction product in the test sample.

2. The process of claim 1 wherein the basic reagent contains polyvinylpyrrolidone having an average molecular weight less than 40,000.

3. The process of claim 1 wherein the reducing agent comprises dipyrone.

4. The process of claim 3 wherein the basic reagent contains polyvinylpyrrolidone having an average molecular weight less than 40,000.

* * * * *

UNITED STATES PATENT AND TRADEMARK OFFICE
CERTIFICATE OF CORRECTION

PATENT NO. : 3,874,853
DATED : April 1, 1975
INVENTOR(S) : Ronald K. Byrnes

It is certified that error appears in the above-identified patent and that said Letters Patent are hereby corrected as shown below:

PATENT OFFICE ERRORS

This patent reading "Inventor: Ronald K. Byrnes, Brockton, Mass." should read --Inventor: Ronald J. Byrnes, Brockton, Mass.--;

In the Abstract, lines 4 & 5 "constituent" should read --phosphate--;

APPLICANT'S ERROR

Column 3, line 21 "contructed" should read --constructed--.

Signed and Sealed this twenty-sixth Day of August 1975

[SEAL]

Attest:

RUTH C. MASON
*Attesting Officer*

C. MARSHALL DANN
*Commissioner of Patents and Trademarks*